US 6,703,439 B2

(12) United States Patent
Yano et al.

(10) Patent No.: US 6,703,439 B2
(45) Date of Patent: Mar. 9, 2004

(54) POLYOLEFIN RESIN COMPOSITION AND POLYOLEFIN FILM PREPARED FROM THE SAME

(75) Inventors: Shigeru Yano, Aichi (JP); Mindiaw Wang, Aichi (JP)

(73) Assignee: Mitsui Chemicals, Inc., Tokyo (JP)

( * ) Notice: Subject to any disclaimer, the term of this patent is extended or adjusted under 35 U.S.C. 154(b) by 210 days.

(21) Appl. No.: 09/772,854

(22) Filed: Jan. 31, 2001

(65) Prior Publication Data

US 2001/0018465 A1 Aug. 30, 2001

(30) Foreign Application Priority Data

Feb. 9, 2000 (JP) ............................. 12-031646

(51) Int. Cl.[7] .............................. C08J 5/10; C08K 3/26; C08L 23/00
(52) U.S. Cl. ...................... 524/515; 524/313; 524/423; 524/425; 524/427
(58) Field of Search .................. 524/515, 313, 524/320, 423, 427, 425

(56) References Cited

U.S. PATENT DOCUMENTS 5,015,521 A * 5/1991 Fujii et al. .................. 428/220
5,945,210 A * 8/1999 Senba et al. ............. 428/317.9

FOREIGN PATENT DOCUMENTS

| JP | 62018435 | 9/1993 |
| JP | 62253635 | 9/1993 |
| JP | 79031033 | 9/1993 |

* cited by examiner

Primary Examiner—James J. Seidleck
Assistant Examiner—U. K. Rajguru
(74) Attorney, Agent, or Firm—Burns, Doane, Swecker & Mathis, LLP

(57) ABSTRACT

The invention aims at providing a polyolefin resin composition which is suitably used for the starting material of a polyolefin film balanced in strength, flexibility, and elongation and contains 25 to 70 weight percent of polyolefin resin and 75 to 30 weight percent of an inorganic filler wherein the polyolefin resin contains 40 to 80 weight percent of polyethylene resin and 60 to 20 weight percent of polypropylene, and the polyethylene resin contains 60 to 98 weight percent of a linear low-density polyethylene and 40 to 2 weight percent of a branched low-density polyethylene, a film made of the resin composition as a starting material, and a porous film.

4 Claims, No Drawings

POLYOLEFIN RESIN COMPOSITION AND POLYOLEFIN FILM PREPARED FROM THE SAME

FIELD OF THE INVENTION

The present invention relates to a polyolefin film, a polyolefin resin composition which is the starting material of the polyolefin film, and a porous film prepared by stretching the polyolefin film. Specifically, it relates to a polyolefin film excellent in balance of tensile strength, tensile elongation at break, and the like, a polyolefin resin composition which is the starting material of the polyolefin film, and a porous film prepared by stretching the polyolefin film and having an excellent vapor permeability.

BACKGROUND OF THE INVENTION

A number of processes for producing porous films have hitherto been proposed wherein films are made of polyolefin resin compositions containing a polyolefin resin, an inorganic filler, and various oils and waxes, the resulting films are stretched at least in a uniaxial direction so that interfacial stripping is allowed to occur between the filler and the resin, thus to produce voids. These porous films contain therein a number of minute voids and therefore, have high vapor permeability, but liquid is not allowed to permeate the films. On the basis of this nature, the films are used for a wide variety of purposes including sanitary materials such as a throwaway paper diaper, building materials, reflective films, and galvanic cell separators.

When a porous film is used as a material for the throwaway diaper, the film needs to be flexible. Therefore, the porous film used as a material for the diaper is exclusively polyethylene. However, the film has the disadvantage of having insufficient strength although it has excellent flexibility. For example, Japanese Patent Publication No. 35734/1993 proposes a porous film where a resin composition containing a straight-chain low-density polyethylene consisting of a copolymer of ethylene and α-olefin, an inorganic filler, and a particular oil are used. However, the porous film has the disadvantage of having low strength, although it has good gas permeability and flexibility.

Furthermore, in recent years, the manufacturers of the paper diapers themselves carry out stretching or the formation of porosity from the precursors of porous films in a stretching step incorporated into a process for manufacturing the diapers according to a method such as texture processing or gear stretch. The precursors of the porous films in particular are expected to have good balance in strength, elongation, and flexibility.

SUMMARY OF THE INVENTION

The invention aims at providing a polyolefin film balanced in characteristics such as strength, flexibility, and elongation in a high level, providing a porous film prepared from the polyolefin film and exhibiting an excellent vapor permeability, and providing a polyolefin resin composition suitably used as the starting material of the film.

As a result of intensive studies to solve the aforesaid problems, the present inventors have found that in the production of a polyolefin film, a resin composition comprising polyolefin resins containing particular amounts of polyethylene resin and polypropylene, and an inorganic filler provides a polyolefin film balanced in characteristics such as strength, flexibility, and elongation in a high level and in addition, that a porous film prepared by stretching the polyolefin film has an excellent vapor permeability, thus having accomplished this invention.

That is, the first invention of the invention is a polyolefin resin composition comprising 25 to 70 weight percent of polyolefin resin and 75 to 30 weight percent of an inorganic filler wherein the polyolefin resin contains 40 to 80 weight percent of polyethylene resin and 60 to 20 weight percent of polypropylene, and the polyethylene resin contains 60 to 98 weight percent of a linear low-density polyethylene and 40 to 2 weight percent of a branched low-density polyethylene.

The second invention of the invention is a polyolefin film made of the aforesaid polyolefin resin composition. The polyolefin film herein means a film before undergoing ordinary stretching. That is, the film is the precursory film of a porous film. The third invention of the invention is a porous film prepared by stretching the aforesaid polyolefin film.

The feature of the invention consists in a resin composition comprising 25 to 70 weight percent of polyolefin resin and 75 to 30 weight percent of an inorganic filler wherein the polyolefin resin is a mixed resin comprising 40 to 80 weight percent of polyethylene resin and 60 to 20 weight percent of polypropylene resin, and the polyethylene resin contains 60 to 98 weight percent of a linear low-density polyethylene and 40 to 2 weight percent of a branched low-density polyethylene.

The polyolefin resin composition of the invention is suitably used as the starting material of a polyolefin film balanced in characteristics such as strength, flexibility, and elongation in a high level. Therefore, the polyolefin film of the invention has excellent characteristics as described above. The porous film exhibiting excellent vapor permeability is easily prepared by stretching the polyolefin film of the invention. Accordingly, the polyolefin resin composition, polyolefin film, and porous film of the invention are very useful in the fields of sanitary materials such as a throwaway paper diaper, building materials, reflective films, and galvanic cell separators.

DETAILED DESCRIPTION OF THE INVENTION

The invention is illustrated in detail below. The polyolefin resin composition of the invention is prepared by adding 75 to 30 weight percent of an inorganic filler to 25 to 70 weight percent of polyolefin resin and mixing. In preferred composition, the ratio of the inorganic filler to the polyolefin resin falls in the range of 70 to 40 weight percent to 30 to 60 weight percent. Composition outside the aforesaid ratio is unsuitable for the starting material for the porous film. When the inorganic filler is not greater than 30 weight percent, adjacent mutual voids produced by interfacial stripping between the polyolefin resin and inorganic filler are difficult to joint together. Exceeding 75 weight percent resulting in decreasing elongation in stretching to make stretching difficult.

The polyolefin resin used in the invention is a mixture of polyethylene resin and polypropylene. The ratio of both components is 60 to 20 weight percent of polypropylene to 40 to 80 weight of polyethylene resin. When the polyethylene resin exceeds 80 weight percent, the resulting film fails to have sufficient strength. On the other hand, the polyethylene resin not greater than 40 weight percent causes deterioration in flexibility and elongation.

In the invention, the polyethylene used is a low-density polyethylene. In view of the flexibility of the resulting film and uniformity of thickness thereof after stretching, the polyethylene resin is preferably a resin containing 60 to 98 weight percent of a linear low-density polyethylene and 40 to 2 weight percent of a branched low-density polyethylene. The polyethylene resin preferably has a density of 0.890 to 0.940 g/cm$^3$ and a melt index of 0.1 to 30 g/10 min.

The polypropylene is a propylene homopolymer or a copolymer of propylene and other α-olefin, and preferably has a density of 0.90 to 0.94 g/cm$^3$ and a melt index of 0.1 to 30 g/10 min.

Examples of the inorganic filler include calcium carbonate, barium sulfate, calcium sulfate, barium carbonate, magnesium hydroxide, aluminum hydroxide, zinc oxide, magnesium oxide, titanium oxide, silica, and talc. Of these, calcium carbonate and barium sulfate are preferred. The average particle size of the inorganic filler is preferably 20 μm or less, more preferably 10 μm or less, and most preferably from 0.5 μm to 5 μm.

In order to improve dispersibility to resin, it is preferable that the inorganic filler is subjected to a surface treatment. Preferred surface treatments are those with which the surface of the filler can be covered to make the surface hydrophobic. Examples thereof include higher fatty acids such as stearic acid and lauric acid and the metal salts of these.

As described above, the feature of the invention is that the polyolefin resin used is a mixed resin containing of 40 to 80 weight percent of polyethylene resin and 60 to 20 weight percent of polypropylene. When the polyolefin film is made of the resin composition of the invention as a starting material, for more improvement in characteristics such as flexibility and elongation, it is effective to add 0.5 to 5 weight parts of a hardened castor oil and 0.5 to 5 weight parts of a dehydrated castor oil to 100 weight parts of the aforesaid resin composition or to add 0.5 to 5 weight parts of a liquid ethylene-α-olefin oligomer to 100 weight parts of the aforesaid resin composition.

Herein, the hardened castor oil consists of esters of glycerin with a mixture of fatty acids containing 70 weight percent or more of 12-hydroxyoctadekanoic acid. A commercially available article of the hardened caster oil is CASTOR WAX (trade name) manufactured by Ito Seiyu K. K. The dehydrated castor oil consists of esters of glycerin with a mixture of fatty acids containing 30 weight percent or more of 9,11-octadecadienic acid and 30 weight percent or more of 9,12-octadecadienic acid and furthermore, 70 weight percent or more of both acids in total. A commercially available article of the dehydrated castor oil is DCO (trade name) manufactured by Ito Seiyu K. K.

The liquid ethylene-α-olefin oligomer is formed by copolymerizing ethylene and α-olefin, and has a dynamic viscosity of 50 to 100,000 mm$^2$/sec at 40° C. (JIS K2283). Moreover, ethylene/α-olefin copolymers into which polar groups such as maleic acid group are introduced by modifying with acids also are preferably used. Examples of the commercially available articles of such oligomer include LUCANT HC600 and HC150 (Manufactured by Mitsui Chemicals, Inc., Trade name).

Other additives used in the resin composition can be further blended. Example of such additives include antioxidants, heat stabilizers, light stabilizers, ultraviolet absorbers, neutralizing agents, lubricants, surfactants, anti-blocking agents, antistatic agents, slip agents, and colorants.

The polyolefin resin composition of the invention is prepared by mixing polyolefin resin, an inorganic filler, and other additives as needed. Methods for mixing are not particularly limited, and known mixing machines such as a Henschel mixer, super mixer, and tumbler are used. Thereafter, kneading and subsequently, pelletizing can be carried out by use of an ordinary uniaxial or biaxial screw extruder, or a tandem kneading extruder.

The polyolefin films of the invention are produced by melting the aforesaid resin compositions, preferably the pellets of the compositions, and forming films at a temperature of from the melting point or above, preferably the melting point ±20° C. or above, to a temperature lower than the decomposition temperature of the polyolefin resin by use of a known molding machine such as an extrusion molding machine fitted with aT-die and an inflation molding machine fitted with a circular die. In some cases, films can be directly made of the compositions without pelletizing by use of a molding machine.

The porous films of the invention can be produced by stretching the aforesaid polyolefin films at least in a uniaxial direction by known roll method, tenter method, or gear stretch method at a temperature of from 10° C. or above to a temperature lower than the softening point of the resin (The softening point was measured according to the procedure stipulated by JIS K-6760-1995). Other stretching method includes texture processing at about room temperature. In the respective methods, the vapor permeability is controlled by changing a stretching ratio. Stretching can be carried out in uniaxial stretching in a machine direction (Hereinafter abbreviated as an MD direction) or in a direction rectangular to the MD direction (Hereinafter abbreviated as TD direction) or in biaxial stretching in both directions. Stretching can be done in one step or in multiple steps. The stretching ratio is from about 1.2 to about 10 times. When the stretching ratio is not greater than 1.2 times, it is difficult to acquire sufficient vapor permeability. On the other hand, exceeding 10 times causes break in film. After stretching, a heat setting treatment can be carried out to stabilize the shapes of the resulting pores as needed. The heat setting treatment can be carried out by heating the film at a temperature of from the softening point of a resin to the melting point thereof for 0.05 to 100 sec.

In the polyolefin films of the invention as produced above, the basis weight is from 15 g/m$^2$ to 60 g/m$^2$, the tensile elongation at break per 1 g/m$^2$ in the TD direction is at least 12.5%/(g/m$^2$), and the tensile strength per 1 g/m$^2$ is at least 17 g/25 mm/(g/m$^2$). The porous films are from 15 g/m$^2$ to 50 g/m$^2$ in basis weight and at least 500 g/m$^2$·24 hr in vapor permeability.

EXAMPLES

The invention is more concretely illustrated through examples below. The invention is not to be construed as limited to these examples. The stiffness, strength, and elongation of the polyolefin films and the vapor permeability of the porous films in the examples were measured by the following methods.

(1) Vapor Permeability (g/m$^2$·24 hr)

Ten sheets of samples (10 cm×10 cm) were cut out of a porous film, and measured according to a procedure stipulated by ASTM E-96 at conditions of 40° C-60% RH by a pure water method to find an average value. The measuring time was 24 hrs. The distance between the specimen and the water surface at the initial stage of measurement is 8 mm.

(2) Stiffness (mm)

This was measured according to a procedure stipulated by JIS-L1096 (cantilever method).

<Preparation of Samples>

A polyolefin film of 200-mm width, 300-mm length and 40-g/m² basis weight was wound round a metallic scale of 25-mm width, and then the scale was pulled out. The resulting flat roll (25 mm in width and 300 mm in length) was pressed with a roller of 1-kg weight in one reciprocating motion to prepare a sample.

(3) Tensile Strength [g/25 mm(g/m²)] and Elongation [%/(g/m²)] of the Films

Samples of 25 mm in width×150 mm in length (TD direction) were cut out of a polyolefin film of 40-g/m² basis weight. The samples were pulled at a 50-mm distance between chucks and a stress rate of 500 mm/min in the TD direction according to ASTM D882 to measure the breaking strength and breaking extension in the TD direction.

Example 1

30 weight parts (75 weight percent in polyolefin resin) of a linear low-density polyethylene (Manufactured by Mitsui Chemicals, Inc., Trade name: EVOLUE SP2040), 1 weight part (2.5 weight percent in polyolefin resin) of a branched low-density polyethylene (Mitsui Chemicals, Inc., Trade name: MIRASON F967), 9 weight parts (22.5 weight percent in polyolefin resin) of polypropylene (Manufactured by Grand Polymer K. K., Trade name: F103), and 60 weight parts of calcium carbonate (Manufactured by Dowa Calfine K. K., Trade name: SST-40) were mixed with a tumbler mixer, and then kneaded uniformly by use of a tandem kneading extruder at 230° C. and formed into pellets. The pellets were melted and made into film by use of an extrusion molding machine fitted with a T-die at 240° C. to prepare a polyolefin film of 40-g/m² basis weight. The film was uniaxially stretched between a preheating roll and a stretching roll heated at 70° C. at a stretching ratio of 2.0 times and a winding speed of 20 m/min in the machine direction to prepare a porous film of 20-g/m² basis weight. The composition (weight parts) of the starting materials and results obtained are shown in Tables 1 and 2, respectively.

Example 2

A polyolefin film and a porous film were prepared in a manner similar to Example 1 except that 24 weight parts (60 weight percent in polyolefin resin) of a linear low-density polyethylene (Manufactured by Mitsui Chemicals, Inc., Trade name: EVOLUE SP2040), 6 weight parts (15 weight percent in polyolefin resin) of a branched low-density polyethylene (Manufactured by Nippon Polyolefin K. K., Trade name: J-REX LD-L211), and 10 weight parts (25 weight percent in polyolefin resin) of polypropylene (Manufactured by Grand Polymer K. K. Trade name: F103) were used in place of the polyolefin resin of Example 1. The composition (weight parts) of the starting materials and results obtained are shown in Tables 1 and 2, respectively.

Example 3

A polyolefin film and a porous film were prepared in a manner similar to Example 1 except that 2 weight parts of a hardened castor oil (Manufactured by Ito Seiyu K. K., Trade name: CASTOR WAX) and 2 weight parts of a dehydrated castor oil (Manufactured by Ito Seiyu K. K., Trade name: DCO) were added to 100 weight parts of the composition of Example 1. The composition (weight parts) of the starting materials and results obtained are shown in Tables 1 and 2, respectively.

Example 4

A polyolefin film and a porous film were prepared in a manner similar to Example 1 except that 2 weight parts of a hardened castor oil and 2 weight parts of a dehydrated castor oil in Example 3 were replaced with an ethylene/α-olefin oligomer (Manufactured by Mitsui Chemicals, Inc., Trade name: LUCANT HC600). The composition (weight part) of the starting materials and results obtained are shown in Tables 1 and 2, respectively.

Example 5

A polyolefin film and a porous film were prepared in a manner similar to Example 3 except that 20 weight parts (50 weight percent in polyolefin resin) of a linear low-density polyethylene (Manufactured by Mitsui Chemicals, Inc., Trade name: EVOLUE SP2040), 1 weight part (2.5 weight percent in polyolefin resin) of a branched low-density polyethylene (Manufactured by Mitsui Chemicals, Inc., Trade name: MIRASON F967), and 19 weight parts (47.5 weight percent in polyolefin resin) of polypropylene (Grand Polymer K. K., Tradename: F103) were used in place of the polyolefin resin of Example 3. The composition (weight part) of the starting materials and results obtained are shown in Tables 1 and 2, respectively.

Example 6

A polyolefin film and a porous film were prepared in a manner similar to Example 1 except that the ethylene/α-olefin oligomer (LUCANT HC600) of Example 4 was replaced with LUCANT HC150 (Manufactured by Mitsui Chemicals, Inc., Trade name). The composition (weight part) of the starting materials and results obtained are shown in Tables 1 and 2, respectively.

Comparative Example 1

A polyolefin film and a porous film were prepared in a manner similar to Example 1 except that 39 weight parts (97.5 weight percent in polyolefin resin) of a linear low-density polyethylene (Manufactured by Mitsui Chemicals, Inc., Trade name: EVORYU SP2040) and 1 weight part (2.5 weight percent in polyolefin resin) of a branched low-density polyethylene (Manufactured by Mitsui Chemicals, Inc., Trade name: MIRASON F967) were used in place of the polyolefin resin of Example 1, and polypropylene was not used. The composition (weight part) of the starting materials and results obtained are shown in Tables 1 and 2, respectively.

Comparative Example 2

A polyolefin film and a porous film were prepared in a manner similar to Comparative Example 1 except that 2 weight parts of a hardened castor oil and 2 weight parts of a dehydrated castor oil were added to 100 weight parts of the composition of Comparative Example 1. The composition (weight part) of the starting materials and results obtained are shown in Tables 1 and 2, respectively.

Comparative Example 3

A polyolefin film and a porous film were prepared in a manner similar to Example 1 except that 11 weight parts (27.5 weight percent in polyolefin resin) of a linear low-density polyethylene (Manufactured by Mitsui Chemicals, Inc., Trade name: EVOLUE SP2040), 1 weight part (2.5 weight percent in polyolefin film) of a branched low-density polyethylene (Manufactured by Mitsui Chemicals, Inc., Trade name: MIRASON F967), and 28 weight parts (70 weight percent in polyolefin resin) of polypropylene (Manufactured by Grand Polymer K. K., Trade name: F103) were used in place of the polyolefin resin of Example 1. The composition (weight part) and results obtained are shown in Tables 1 and 2, respectively.

Comparative Example 4

A polyolefin film and a porous film were prepared in a manner similar to Example 1 except that 35 weight parts (87.5 weight percent in polyolefin resin) of a linear low-density polyethylene (Manufactured by Mitsui Chemicals, Inc., Trade name: EVOLUE SP2040), 1 weight part (2.5 weight percent in polyolefin resin) of a branched low-density polyethylene (Manufactured by Mitsui Chemicals, Inc., Trade name: MIRASON F967), and 4 weight parts (10 weight percent in polyolefin resin) of polypropylene (Grand Polymer K. K., Tradename: F103) were used in place of the polyolefin resin of Example 1. The composition (weight part) of the starting materials and results obtained are shown in Tables 1 and 2, respectively.

Comparative Example 5

A polyolefin film and a porous film were prepared in a manner similar to Example 1 except that 40 weight parts (100 weight percent in polyolefin resin) of polypropylene (Manufactured by Grand Polymer K. K., Trade name: F103) were used in place of the polyolefin resin of Example 1. The composition (weight part) of the starting material and results obtained are shown in Tables 1 and 2, respectively.

Comparative Example 6

65 weight parts (86.7 weight percent in polyolefin resin) of a linear low-density polyethylene (Manufactured by Mitsui Chemicals, Inc., Trade name: EVOLUE SP2040), 10 weight parts (13.3 weight percent in polyolefin resin) of polypropylene (Manufactured by Grand Polymer K. K., Trade name: F103), and 25 weight parts of calcium carbonate (Manufactured by Dowa Calfine K. K., Trade name: SST-40) were mixed with a Tumbler mixer, then uniformly kneaded by use of a tandem kneading extruder at 230° C., and formed into pellets. The pellets were melted and made into film by use of an extrusion molding machine fitted with a T-die at 240° C. to prepare a polyolefin film of 40-g/m² basis weight. The film was uniaxially stretched between a preheating roll and a stretching roll heated at 70° C. at a stretching ratio of 2.0 times and a winding speed of 20 m/min in the machine direction to prepare a porous film of 20-g/m² basis weight. The composition (weight part) of the starting materials and results are shown in Tables 1 and 2, respectively.

Comparative Example 7

65 weight parts (86.7 weight percent in polyolefin resin) of a linear low-density polyethylene (Manufactured by Mitsui Chemicals, Inc., Trade name: EVOLUE SP2040), 10 weight parts (13.3 weight percent in polyolefin resin) of polypropylene (Manufactured by Grand Polymer K. K., Trade name: F103), and 25 weight parts of calcium carbonate (Manufactured by Dowa Calfine K. K., Trade name: SST-40) were mixed with a tumbler mixer, uniformly kneaded by use of a tandem kneading extruder at 230° C., and formed into pellets. The pellets were melted and made into film by use of an extrusion molding machine fitted with a T-die at 240° C. to prepare a polyolefin film of 160-g/m² basis weight. The film was uniaxially stretched between a preheating roll and a stretching roll heated at 70° C. at a stretching ratio of 4.0 times and a winding speed of 20 m/min in the machine direction and subsequently, stretching of 2.0 times was carried out in a rectangular to the machine direction and a vertical direction by use of a tenter of 100° C. to prepare a porous film of 20-g/m² basis weight. The composition (weight part) of the starting materials and results obtained are shown in Tables 1 and 2, respectively.

<Description of Table 1>

LL: Linear low-density polyethylene (Manufactured by Mitsui Chemicals, Inc., Trade name: EVOLUE SP2040), Branched LD (1): Branched low-density Polyethylene (Manufactured by Mitsui Chemicals, Inc., Trade name: MIRASON F967), Branched LD (2): (Manufactured by Nippon Polyolefin K. K., Trade name: J-REX LD-L211), PP: Polypropylene (Manufactured by Grand Polymer K. K., Trade name: F103), A: Hardened castor oil (Manufactured by Ito Seiyu K. K., Trade name: CASTOR WAX), B: Dehydrated castor oil (Manufactured by Ito Seiyu K. K., Trade name: DCO), C: Ethylene/α-olefin oligomer (Manufactured by Mitsui Chemicals, Inc., Trade name: LUCANT HC600), and D: Ethylene/α-olefin oligomer (Manufactured by Mitsui Chemicals, Inc., Trade name: LUCANT HC150).

<Description of Table 2>

Synthetic Judgement

○: In polyolefin film, the tensile strength is 17 g/25 mm/(g/m²) or more, and the elongation is 12.5%/(g/m²) or more, and in porous film, the vapor permeability is 500 g/m² 24 hr or more, and the tensile strength is 14 g/25 mm/(g/m²) or more.

x: The aforesaid characteristics do not reach the aforesaid values.

TABLE 1

| | LL weight part | Branched LD (1) weight part | Branched LD (2) weight part | PP weight part | Dispersant Kind weight part |
|---|---|---|---|---|---|
| Example 1 | 30 | 1 | — | 9 | — |
| Example 2 | 24 | — | 6 | 10 | — |
| Example 3 | 30 | 1 | — | 9 | A: 2 B: 2 |
| Example 4 | 30 | 1 | — | 9 | C: 2 |
| Example 5 | 20 | 1 | — | 19 | A: 2 B: 2 |
| Example 6 | 30 | 1 | — | 9 | D: 2 |
| Comparative Example 1 | 39 | 1 | — | — | — |
| Comparative Example 2 | 39 | 1 | — | — | A: 2 B: 2 |
| Comparative Example 3 | 11 | 1 | — | 28 | — |
| Comparative Example 4 | 35 | 1 | — | 4 | — |
| Comparative Example 5 | — | — | — | 40 | — |
| Comparative Example 6 | 65 | — | — | 10 | — |
| Comparative Example 7 | 65 | — | — | 10 | — |

TABLE 2

| | Polyolefin Film | | | Porous Film | | |
|---|---|---|---|---|---|---|
| | Tensile Strength [g/25 mm/(g/m²)] | Elongation [%/(g./m²)] | Stiffness (mm) | Vapor Permeability (g/m²·24 hr) | Tensile Strength [g/25 mm/(g/m²)] | Synthetic Judgement |
| Example 1 | 21 | 13.8 | 120 | 2500 | 16 | ○ |
| Example 2 | 19 | 12.8 | 110 | 2200 | 15 | ○ |
| Example 3 | 20 | 16.3 | 115 | 2200 | 16 | ○ |
| Example 4 | 22 | 17.0 | 110 | 3700 | 17 | ○ |
| Example 5 | 21 | 16.5 | 120 | 2600 | 17 | ○ |
| Example 6 | 19 | 16.0 | 110 | 2400 | 16 | ○ |
| Comparative Example 1 | 14 | 16.3 | 90 | 2400 | 12 | X |
| Comparative Example 2 | 14 | 17.0 | 75 | 2200 | 12 | X |
| Comparative Example 3 | 23 | 10.5 | 150 | 2700 | 17 | X |
| Comparative Example 4 | 16 | 15.5 | 110 | 2500 | 13 | X |
| Comparative Example 5 | 23 | 10.0 | 160 | 2900 | 18 | X |
| Comparative Example 6 | 19 | 14.0 | 120 | 100 | 17 | X |
| Comparative Example 7 | 18 | 5.0 | 400 | 150 | 22 | X |

What is claimed is:

1. A polyolefin film made from a resin composition comprising 25 to 70 weight percent of polyolefin resin and 75 to 30 weight percent of an inorganic filler, wherein the polyolefin resin comprises 40 to 80 weight percent of polyethylene resin and 60 to 20 weight percent of polypropylene, and the polyethylene resin comprises 60 to 98 weight percent of a linear low-density polyethylene and 40 to 2 weight percent of a branched low-density polyethylene, wherein the basis weight of the film is from 15 to 60 g/m², the tensile elongation at break per 1 g/m² in a TD direction is at least 12.5%/(g/m²), and the tensile strength per 1 g/m² is at least 17 g/25 mm(g/m²).

2. A polyolefin film as described in claim 1, wherein the composition further contains 0.5 to 5 weight parts of a hardened castor oil and 0.5 to 5 weight parts fo a dehydrated castor oil to 100 weight parts of the resin composition.

3. A polyolefin film as described in claim 1, wherein the composition further contains 0.5 to 5 weight parts of a liquid ethylene/α-olefin oligomer to 100 weight parts of the resin composition.

4. A porous film prepared by stretching the polyolefin film as described in claim 1, wherein the basis weight of the porous film is from 15 to 5 g/m² and the vapor permeability is at least 500 g/m²·24 hr.

* * * * *